(12) United States Patent
McCaskey, IV et al.

(10) Patent No.: US 8,702,518 B2
(45) Date of Patent: Apr. 22, 2014

(54) DYNAMICALLY PROVIDING GUEST PASSES FOR A VIDEO GAME

(75) Inventors: John A. McCaskey, IV, Seattle, WA (US); Derrick Jason Birum, Duvall, WA (US); John Cook, Seattle, WA (US); Erik Axel Johnson, Issaquah, WA (US); Gregory Coomer, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 1267 days.

(21) Appl. No.: 11/690,770

(22) Filed: Mar. 23, 2007

(65) Prior Publication Data
US 2008/0234043 A1    Sep. 25, 2008

(51) Int. Cl.
A63F 9/24    (2006.01)
(52) U.S. Cl.
USPC .......................................................... 463/42
(58) Field of Classification Search
USPC .................. 463/16–20, 25, 42; 705/5, 14
See application file for complete search history.

(56) References Cited

U.S. PATENT DOCUMENTS

| | | | |
|---|---|---|---|
| 6,443,452 B1* | 9/2002 | Brune ....................... | 273/143 R |
| 6,811,486 B1* | 11/2004 | Luciano, Jr. ................... | 463/24 |
| 7,070,501 B2* | 7/2006 | Cormack et al. ............... | 463/16 |
| 2003/0032476 A1* | 2/2003 | Walker et al. ................... | 463/25 |
| 2003/0064788 A1* | 4/2003 | Walker et al. ................... | 463/20 |
| 2004/0053666 A1* | 3/2004 | Vancura ......................... | 463/16 |
| 2004/0106449 A1* | 6/2004 | Walker et al. ................... | 463/25 |
| 2004/0106454 A1* | 6/2004 | Walker et al. ................... | 463/42 |
| 2004/0128197 A1* | 7/2004 | Bam et al. ....................... | 705/14 |
| 2006/0068898 A1* | 3/2006 | Maya ............................. | 463/25 |
| 2006/0247955 A1* | 11/2006 | Humphrey ...................... | 705/5 |
| 2006/0264257 A1* | 11/2006 | Jaffe et al. ..................... | 463/20 |
| 2006/0287072 A1* | 12/2006 | Walker et al. ................... | 463/25 |
| 2007/0060241 A1* | 3/2007 | Low et al. ....................... | 463/13 |

OTHER PUBLICATIONS

Steam Support Center, "Guest Passes" (last updated Dec. 5, 2006), <http://support.steampowered.com/cgi-bin/steampowered.cfg/php/eduser/std_adp.php?P_f . . . >, 3 pages.
Game Informer, "GDC 06: The Valve Interview" (posted Mar. 24, 2006), <http://www.gameinformer.com/News/Story/200603/N06.0324.2249.59492.htm>, 8 pages.

* cited by examiner

Primary Examiner — Steve Rowland
(74) Attorney, Agent, or Firm — Frommer Lawrence & Haug LLP; John W. Branch

(57) ABSTRACT

A system and method for determining and providing one or more guest passes for temporary access to one or more video games to a first player that was previously granted membership to a platform that offers access to playing these video games. One or more different determinations are made on information related to the first player and/or available video games to generate one or more guest passes for a video game that is at least somewhat relevant to the first player. In at least one embodiment, one or more of the different determinations can be intrinsically and/or extrinsically weighted to further refine the generation of a guest pass for a video games that is at least somewhat relevant to the first player, and thereby more likely to be offered by the first player to a second player. Also, the platform enables the determining and generating of the one or more guest passes to the one or more video games for the first player.

39 Claims, 10 Drawing Sheets

400

| Games | | | | |
|---|---|---|---|---|
| Game Title | Game Status | Guest Passes | Game Rank | Game Developer |
| | | | | |

| Guest Passes | | | |
|---|---|---|---|
| Game Title | Guest Pass Status | Expiration Date | Guest Pass Recipient |
| | | | |

FIG. 4B

DYNAMICALLY PROVIDING GUEST PASSES FOR A VIDEO GAME

FIELD OF THE INVENTION

The invention is generally directed to video games, and more particularly to automatically generating guest passes to video games for elective distribution by a user.

BACKGROUND OF THE INVENTION

Video games are typically made up of one or more programs that involve user/player interaction with a controller interface to generate visual feedback on a video screen. A video game also typically includes some system of reward presented to the user in return for meeting certain accomplishments within the framework of a given set of rules. The various types of electronic computing devices that video games are played on can include personal computers, consumer video game consoles, arcade video game consoles, mobile telephones, smart mobile telephones, handheld video game consoles, and personal digital assistants (PDA). Many users identify their computing device of choice as offering a distinct form of video gaming apart from the rest. However, the main separations between the many computing devices are interface options, and the level of social interaction between other players of the same video game.

Early video games were primarily a single player gaming experience, where the player matched their wits and skill against a program running on an electronic computing device. In the past, the primary video game social interaction was the listing and comparison ranking of scores and/or completed game levels. Today, video games are often designed for simultaneous interactive play between two or, in some cases, thousands of players over a local or remote network. Consequently, it has become relatively common for video game players to ask their friends to simultaneously play a new and/or favorite video game over a network. However, since access to most video games is not free, players of new and/or unknown video games often must play alone or with a stranger until one or more of their friends also decides to purchase access to the same video game.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein:

FIG. 4A shows a diagram of one embodiment of an exemplary user interface for displaying a listing of Video games available to a player;

FIG. 4B illustrates a diagram of one embodiment of an exemplary user interface for displaying guest passes that are available for use by a player;

DESCRIPTION OF THE EMBODIMENTS OF THE INVENTION

Figure 1:
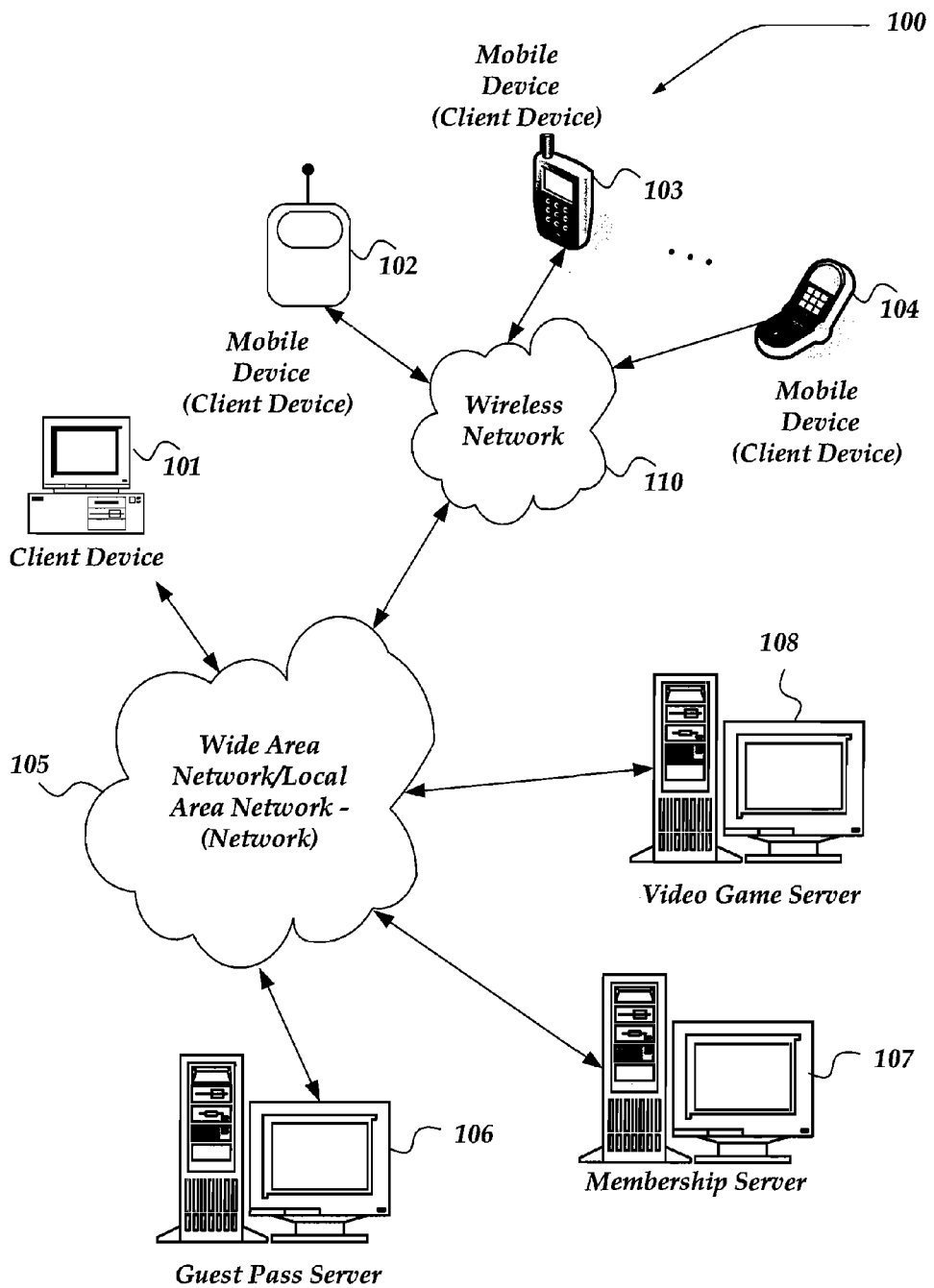
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed to determining and providing of one or more guest passes for temporary access to one or more video games to a first player that was previously granted membership to a platform that offers access to playing these video games. One or more different determinations are made on information related to the first player and/or available video games to generate one or more guest passes for a video game that is at least somewhat relevant to the first player. In at least one embodiment, one or more of the different determinations can be intrinsically and/or extrinsically weighted to further refine the generation of a guest pass for a video games that is at least somewhat relevant to the first player, and thereby more likely to be offered by the first player to a second player. Also, the platform is provided to enable the determining and generating of the one or more guest passes to the one or more video games for the first player.

As used herein, the meaning of the phrase "guest pass" at least refers to a data structure and it may include plural references. The guest pass enables a first player to provide a second player with an opportunity to obtain a unique guest license for temporary access to play at least a portion of a video game. The guest pass and/or the guest license can include one or more conditions, including, but not limited to, when and/or who can provide it to another player, a type of player that it can be offered to, full or partial access to "guest" play a video game, the number of times that a video game can be "guest" accessed by the second player, amount of time that the video game is available for "guest" access once a unique guest license is obtained by the second player.

In at least one embodiment, a first player makes a request of the platform to send an invitation message on behalf of the first player to a second player for a guest pass to access a video game. The invitation message may be wholly or partly automatically generated by the platform. In at least one embodiment, the first player can provide at least some portion of the invitation message to the guest pass, e.g., GUEST PASS INVITATION FROM A MEMBER OF THE COOL PLATFORM—"JJ, I just got access to an exciting video game on the cool platform. Please accept an install of the guest pass temporary license so that we can try out playing this video game together this Saturday night at 8 pm. DD."

In at least one or more embodiments, the platform can provide the guest pass invitation message to the second player through one or more modes of communication, including but not limited to a telephone call, email, text message, instant message, physically mailed guest pass invitation, and the like. In at least one embodiment, the platform verifies and authenticates the membership of the first player and determines if the second player is also a member of the platform. If the second player is also a member of the platform, a unique guest pass license to the video game is provided on behalf of the first player to the second player. The second player can subsequently redeem the guest pass license with the platform, either locally or remotely over a network, to enable access and/or an install of the video game as limited by the terms of the guest pass license.

In at least one or more embodiments, if the second player is not initially a member of the platform, the platform can invite the second player to join the platform as at least a temporary member to obtain the guest pass for the video game. Once the second player is verified and authenticated as a member of the platform, a unique guest pass license to the video game can be provided to the second player on behalf of the first player. The second player can subsequently redeem the guest pass license with the platform, either locally or remotely over a network, to enable access and/or an install of the video game as limited by the terms of the guest pass license.

Further, in at least one or more embodiments, the first player may be a member of the platform, but may have not already obtained access to the video game associated with one or more determined guest passes. In at least this case, the first player may use at least one of the guest passes himself to obtain temporary access to a video game as well as provide an invitation message to a second player to accept a guest pass to the same video game.

Also, in at least one or more embodiments, the different determinations for determining which video game to generate one or more guest passes for the first player can include, but are not limited to the following: player type; membership type; title, genre, and frequency of play for video games accessed by the first player; title, genre, and frequency of play for video games accessed by contacts of the first player; other available video games that are related to the title and/or genre of those video games previously accessed by the first player; other available video games that are associated with at least one marketing promotion; usage, conversion rate, and optimal time period of guest passes previously provided to the first player and/or other players in the contacts of the first player; and feedback of the first player regarding previously provided guest passes. Also, in at least one or more embodiments, each result of each different determination can be assigned a particular unique weight, and subsequently aggregated with other determinations for determining the video game guest passes to be provided to the first player. Furthermore, the determinations themselves may be uniquely weighted and aggregated, in addition to the weights assigned to their particular results.

In yet at least one or more embodiments, the first player may be provided with a credit for causing an invitation for a guest pass to be provided to the second (another) player. This credit could be embodied in one or more ways, including, but not limited to, additional access to aspects of one or more video games, additional time and/or opportunities to play one or more video games; at least partial price discounts for buying access to play one or more video games; recognition of the first player by the platform for causing at least one guest pass to be provided to one or more other players. The platform could recognize frequent and successful invitational behavior by the first player towards other players in one or more ways. This guest pass invitation behavior recognition could be communicated directly to the first player's contacts, lists, and/or social networks, and/or one or more postings at one or more locations, e.g., blogs, web sites, lists, message boards, chat rooms, and the like, that other players are likely to acknowledge.

In yet at least one or more further embodiments, a full or partial list of the guest passes generated for the first player to offer to other players could be accessed or directly provided by the platform to other players that are in the first player's contacts, lists, and/or social networks. Also, in at least one embodiment, the platform could provide and/or one or more postings regarding the available guest passes associated with the first player at one or more locations, e.g., blogs, web sites, lists, message boards, chat rooms, and the like, that other players are likely to acknowledge. In at least one embodiment, the first player could be provided with the option to opt in or opt out of disclosing their available guest passes to at least a portion of the other players.

Additionally, in at least one or more embodiments, the platform itself may be arranged to automatically originate an invitation to one or more players to try one or more guest passes for one or more video games. Further, in at least one embodiment, the platform originated guest pass invitations might be provided for players that are members of the platform and/or other players that are not platform members. Also, in at least one embodiment, the platform originated guest pass invitations would be based on determinations that are substantially the same in some ways to those determinations made in regard to the first player as discussed elsewhere, albeit different in other ways. For example, the determinations for platform originated guest passes might include: player type; membership type; non-membership; title, genre, and frequency of play for video games accessed by a player; title, genre, and frequency of play for video games accessed by contacts of the player; other available video games that are related to the title and/or genre of those video games previously accessed by the player; other available video games that are associated with at least one marketing promotion; usage, conversion rate, and optimal time period of guest passes previously provided to the player; and feedback of the player regarding previously provided guest passes. Furthermore, in at least one or more embodiments, each result of each different determination can be assigned a particular unique weight, and subsequently aggregated with other determinations for determining the platform originated invitations to video game guest passes to be provided to the player. Moreover, the determinations themselves may be uniquely weighted and aggregated, in addition to the weights assigned to their particular results.

Also, in at least one embodiment, the platform for determining and generating the guest passes can be arranged to operate as a system in one or more local or remote environments, including peer to peer, client-server, stand alone application, web based service, and/or the like. Also, the platform can be accessed by players with one or more different types of computing devices, including, but not limited to, personal computers, consumer video game consoles, arcade video game consoles, mobile telephones, smart watches, handheld video game consoles, and/or personal digital assistants (PDA). Furthermore, in at least one environment, the platform can also provide at least one of (1) access to the video game for playing by the first player; and (2) "guest" access to the video game for playing by the second player.

Moreover, although the embodiments of the processes, apparatuses, systems, and processor readable medias disclosed herein, mostly discuss providing guest passes for video games, the invention is not so limited. Rather, the inventive determination, generation, and distribution of guest passes for video games can also be directly applied to any type of software application or online service, not just those directly related to video games. In particular, in the discussion herein, the phrase "video game" could be replaced throughout with the phrase "software application" and the term :"player" could be replaced with the term "user" without departing from the spirit and/or scope of the disclosed invention. For example, such embodiments may be employed with a variety of other types of entertainment applications, including movies, videos, as well as desktop application software, or other even other forms of productivity applications.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Guest Pass Sever 106, Membership Server 107, Video Game Server 108, mobile (wireless) devices 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome display on which only text may be displayed. In another example, a web-enabled mobile device may have a touch sensitive screen, a stylus, and several lines of a color display in which both text and graphics may be displayed.

Mobile devices 102-104 may further be configured to include a client application that enables an end-user to log into a membership account on platform 112 that includes servers 106, 107, and 108. Such an end-user membership account, for example, may be configured to enable one or more activities, including: enabling the member to send/receive messages with other members, non-members, and the platform administrator(s); access content on selected web pages; access chat rooms; access blogs; access video games for playing either singly or with other members; purchase video games for play; and try out available video games prior to purchase. However, participation in at least some of these activities may also be performed without logging into the end-user membership account. Additionally, mobile devices 102-104 may also communicate with non-mobile (wired) client devices, such as client device 101, or the like.

Figure 3:
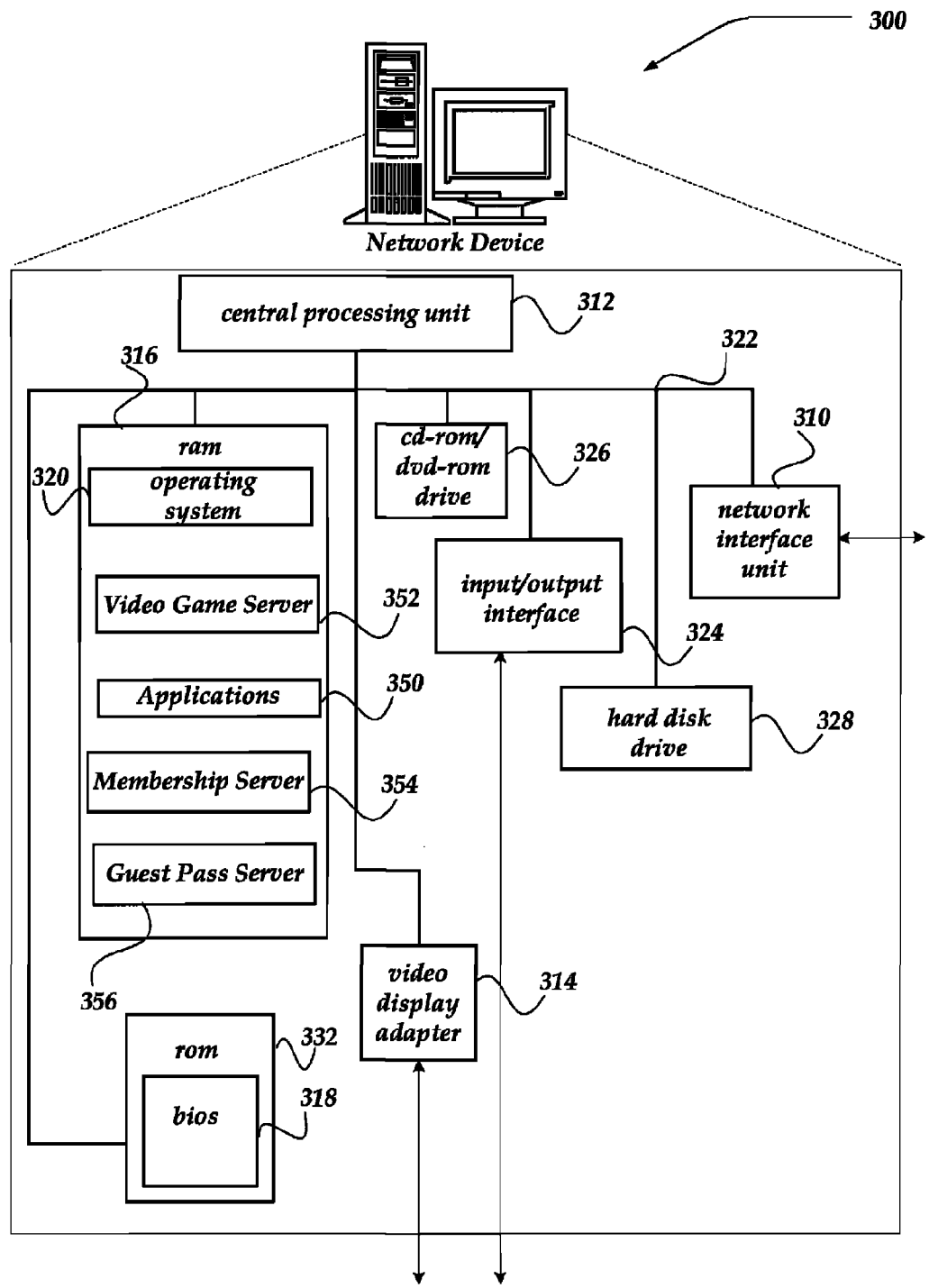
FIG. 3 illustrates a schematic diagram of one embodiment of an exemplary network device.

Client device 101 may include virtually any computing device capable of communicating over a network to send and receive information, such as network device 300 shown in FIG. 3, or the like. The set of such client devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with communication provided over network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further employ a plurality of access technologies including 2nd (2G), 3rd (3G), and $4^{th}$ (4G) generation radio access for cellular systems, WLAN, WiMax, Wireless Router (WR) mesh, and the like. Access technologies such as 2G, 3G, 3G, and future wireless access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), Universal Mobile Telephone System (UMTS), and the like. In essence, wireless network 110 may include virtually any wireless communication mechanism by which information may travel between mobile devices 102-104 and another computing device, network, and the like.

Network 105 is configured to couple platform 112 and its servers with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between platform 112, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Platform 112 can also include a variety of services used to provide services to remotely located members. Such services include, but are not limited to web services, third-party services, audio services, video services, email services, IM services, SMS services, MMS services, VOIP services, video game services, blogs, chat rooms, gaming services, calendaring services, shopping services, photo services, or the like. Although FIG. 1 illustrates platform 112 including servers 106, 107, and 108 as physically separate computing devices, the invention is not so limited. For example, one or all of the servers can be operated on one computing device, without departing from the scope or spirit of the present invention. Also, devices that may operate as platform 112 include personal computers desktop computers, multiprocessor systems, microprocessor-based or programmable consumer electronics, network PCs, servers, and the like.

Illustrative Mobile Device

Figure 2:
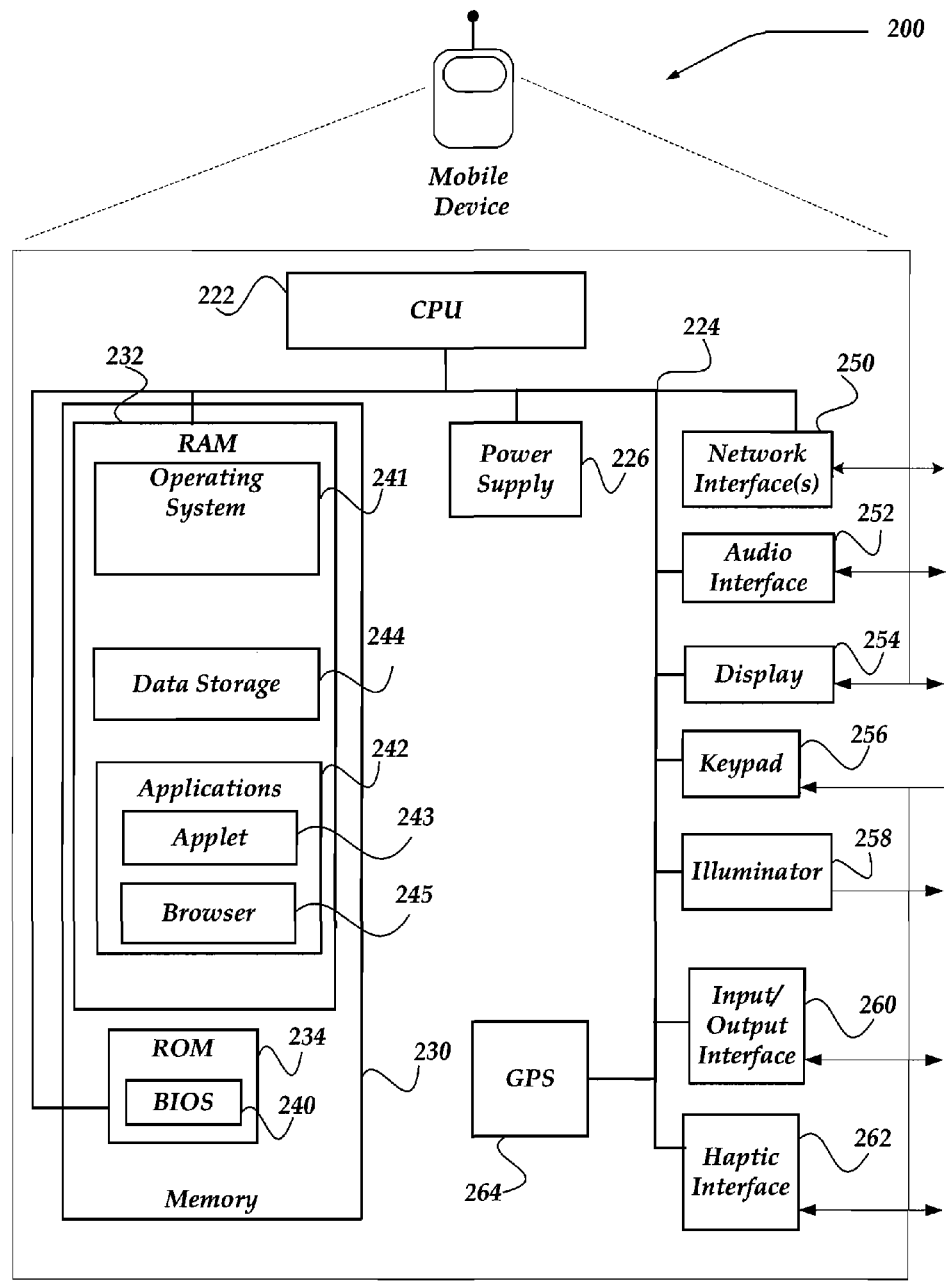
FIG. 2 shows a schematic diagram of one embodiment of an exemplary mobile device.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), Wide CDMA (CDMA), time division multiple access (TDMA), Universal Mobile Telephone Service (UMTS), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, video games, gaming programs, search programs, shopping cart programs, and so forth. Applications 242 may further include applet 243 and browser 245. The browser application may be configured to receive and display graphics, text, multimedia, and the like, employing virtually any web based language, including a wireless application protocol messages (WAP), and the like. In one embodiment, the browser application for the mobile device is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display content and communicate messages.

Browser 245 may be configured to receive and enable a display of rendered content provided by platform 112. Further, browser 245 enables the user of mobile device 200 to select different actions displayed by the rendered content. In at least one embodiment, browser 245 enables the user to select one or more of a product to purchase, search for content and display the result, call a mobile telephonic device, display and respond to messages, or the like. Various embodiments for rendering the content for display on the mobile device are described in more detail below.

Illustrative Network Device

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, guest pass server 106, membership server 107, video game server 108, and/or client device 101 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM optical drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of processor-readable storage media. Processor readable storage media may include volatile, nonvolatile, removable, and non-removable media implemented in any method or technology for storage of information, such as processor readable instructions, data structures, program modules, code, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed and read by a processor for a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Membership server 354, Guest Pass server 356, and Video Game server 352 may also be included as an application program within applications 350. Also, Membership server 354, Guest Pass server 356, and Video Game server 352 can be configured as a platform for providing video game services to players that have signed up as a member.

Illustrative User Interfaces

FIG. 4A shows a diagram of one embodiment of exemplary "My Games" user interface 400 for displaying a listing of video games available to a player on a platform. As shown, relevant information regarding video games available to the player is displayed, including: game title, game status, game rank, game developer, and guest passes. In one or more other embodiments, one or more other types of information can be selected by the player for display, including, but not limited to, date of purchase, purchase cost of video game, current cost of video game, date of release, number of times played, number of contacts of the player that also own the video game, number of contacts of the player that are currently playing the video game, available updates for the video game, available additional features and/or episodes for the video game, and/or the like.

FIG. 4B illustrates a diagram of one embodiment of exemplary "Guest Passes" user interface 410 for displaying information regarding guest passes that are available for use by a player. As shown, relevant information regarding the guest passes available to the player is displayed, including: game title, guest pass status, expiration date, and guest pass recipient. However, in one or more other embodiments, one or more types of information can be selected by the player for display, including, but not limited to, guest pass conversion by recipients, suggested recipients for receiving a guest pass from the player, and/or the like.

Illustrative Communication Flow

Figure 5A:
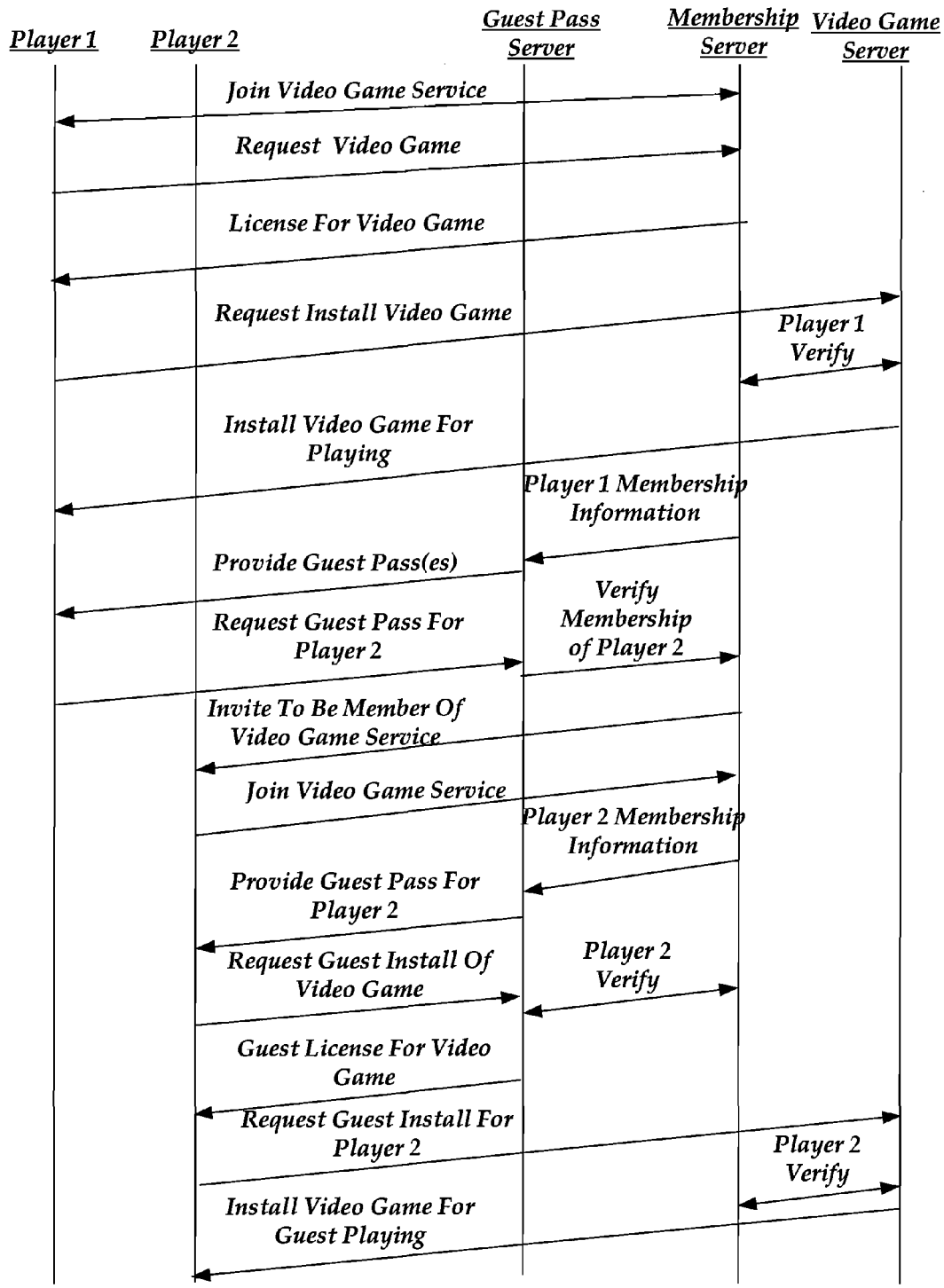
FIG. 5A shows one embodiment of the communication flow between two players, a video game server, membership server, and a guest pass server, wherein one of the two players is not initially a member of a video game platform.

FIG. 5A shows one embodiment of the communication flow between two players, a video game server, membership server, and a guest pass server. Also, as shown, the second of the two players is not initially a member of the platform as represented at least in part by the operation of the guest pass server, membership server, and the video game server. Generally, player 1 requests access to the video game service provided by the platform. After verifying player 1's membership, the membership server provides player 1 with access to the platform's services. Next, player 1 requests access to a new video game from the membership server which provides player 1 with a license to access the new video game. In some embodiments, player 1 may pay for each license provided by the membership server and in other embodiments, the license is automatically provided to player 1 as part of a subscription service. In any case, player 1 employs the received license to request the video game server to provide an install of the new video game for playing.

After verifying the membership of player 1, the video game server provides an install of the new video game to player 1 for playing. Also, the membership server provides the guest pass server with information regarding player 1's membership and recent access to the new video game. The guest pass server employs this information and other information to determine and provide player 1 with at least one guest pass for playing the new video game. Player 1 makes a request of the guest pass server to send an invitational message to player 2 for a guest pass to the new video game.

As shown, the guest pass server employs the membership server to determine if player 2 is a member of the video game service platform. In this case, player 2 is not a member, so an invitation to become a member is forwarded to player 2 by the membership server. In at least one or more embodiments, the membership invitation would indicate that player 2 should join the platform so that they can receive a guest pass from player 1. Next, player 2 becomes a member by joining the video game service platform. The membership server provides player 2's membership information to the guest pass server. Once player 2's membership is established, the guest pass server provides player 2 with player 1's invitational message for a guest pass to play the new video game.

After player 2 requests a guest pass in response to a previously provided invitational message, the guest pass server verifies the membership information of player 2 with the membership server. If player 2's membership information indicates that they can and are willing to receive the guest pass, the guest pass server provides a unique guest pass license to player 2. Player 2 requests a guest install of the new video game by providing the unique guest pass license to the video game server. The video game server authenticates and verifies player 2 with the membership server and then installs the new video game for playing by player 2 based on the limitations and conditions of the guest license.

Additionally, although not shown here, once the time period for the guest pass begins to expire and/or has expired, the platform will notify player 2 of one or more opportunities to subscribe to a service and/or purchase permanent access to the new video game. In at least one embodiment, the membership server enables player 2 to fulfill one or more opportunities for accessing the new video game.

Figure 5B:
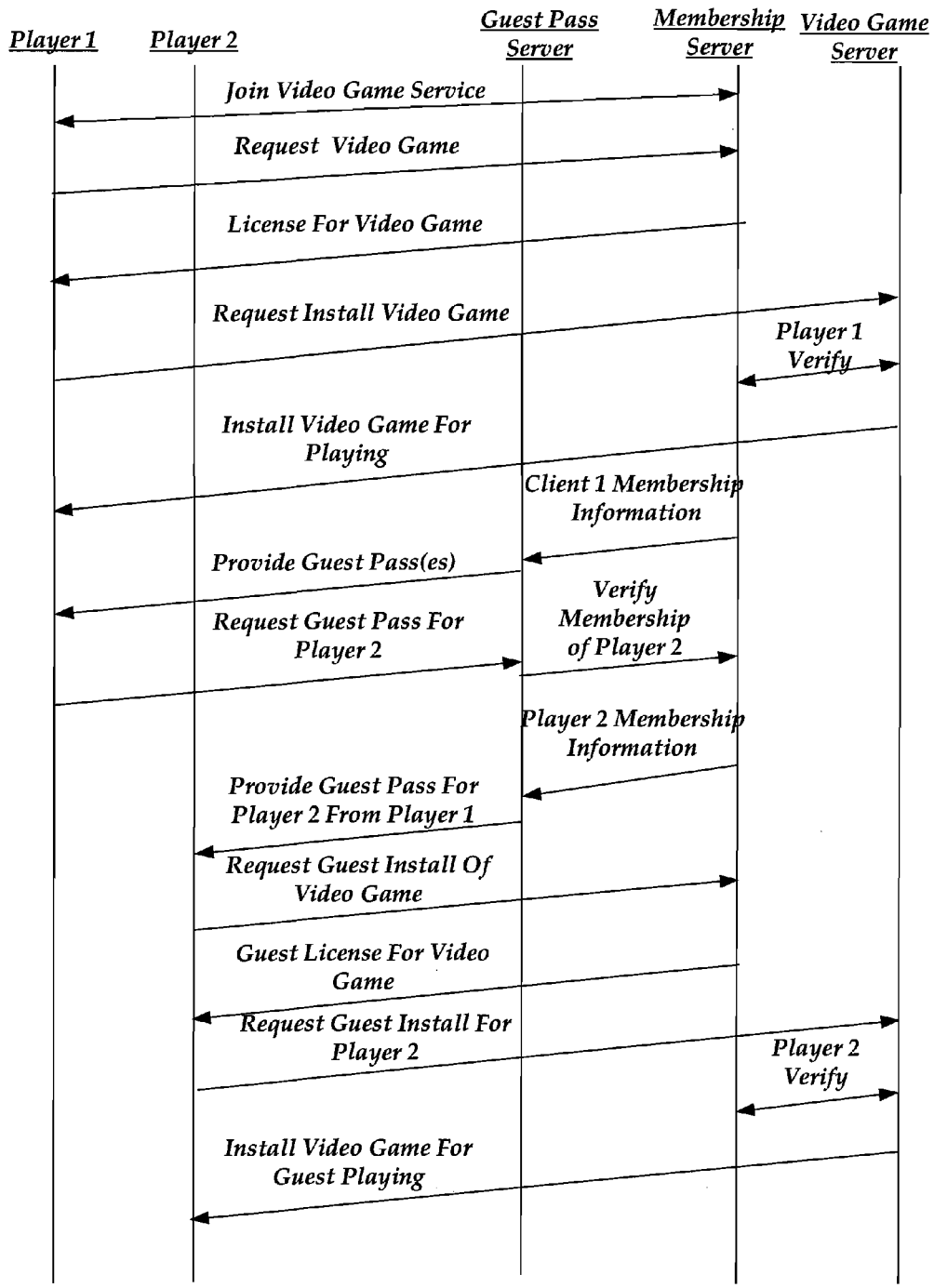
FIG. 5B shows one embodiment of communication flow between two players, a video game server, membership server, and a guest pass server, wherein both of the two players are initially members of a video game platform.

FIG. 5B shows one embodiment of the communication flow between two players, a video game server, membership server, and a guest pass server, which is substantially similar to the communication flow for FIG. 5A as discussed above. However, in FIG. 5B, both players are initially members of the platform as represented at least in part by the operation of the guest pass server, membership server, and the video game server. As shown, verification and authentication of membership information for player 2 is still performed by the platform but the process for installing and playing the guest version of the new video game is somewhat simplified.

Illustrative Flow Charts

Figure 6A:
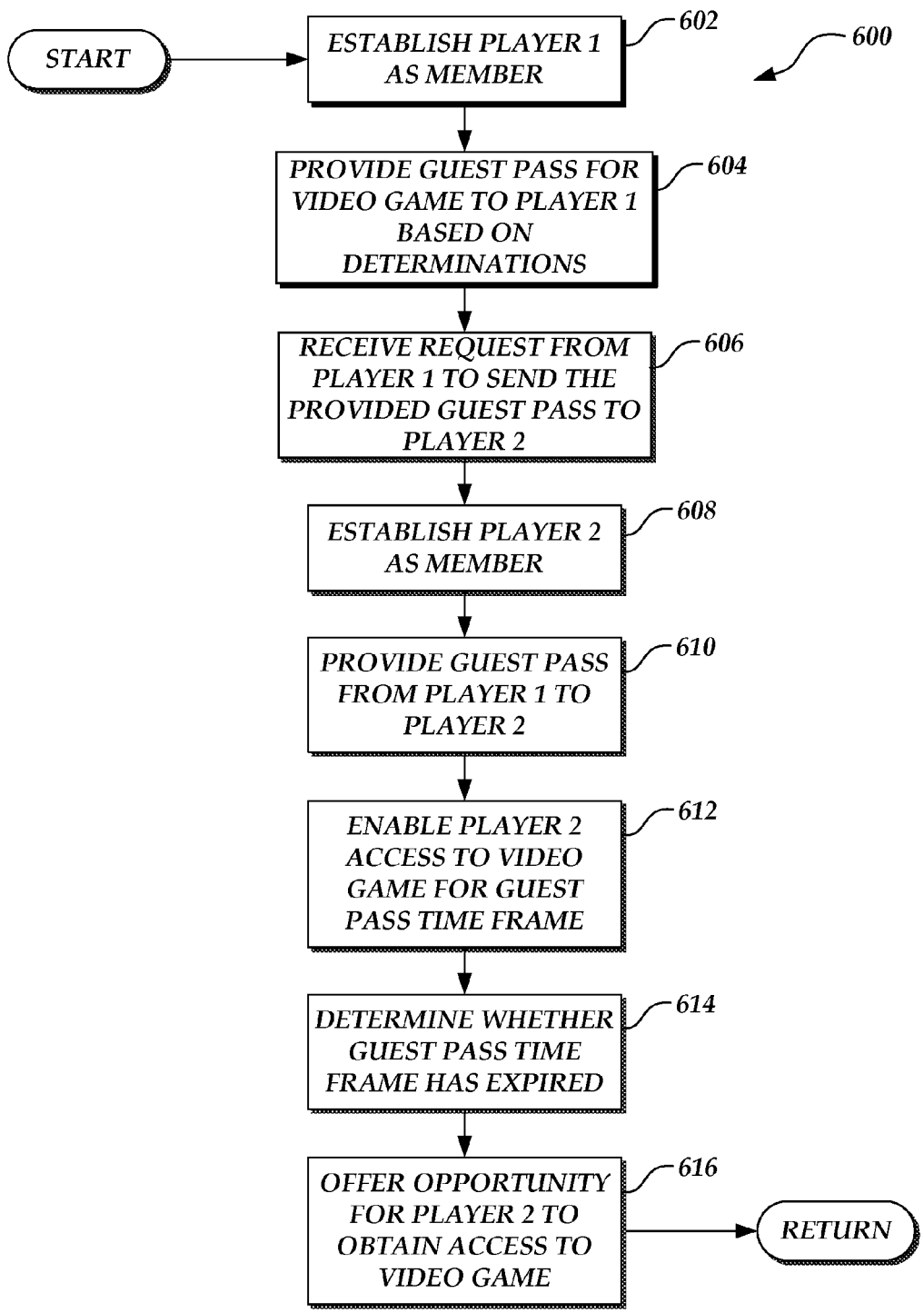
FIG. 6A illustrates a flow chart of a process for enabling a player to provide a guest pass invitation to another player.

FIG. 6A illustrates a flow chart of process 600 for providing a guest pass to a second player. Moving from a start block, the process steps to block 602 where the membership status of a first player is established by a platform that determines and generates guest passes for video games. Information that at least in part relates to the first player's platform behavior is employed to determine and generate at least one guest pass. This information can include one or more of the following: player type; membership type; title, genre, and frequency of play for video games accessed by the first player; title, genre, and frequency of play for video games accessed by contacts of the first player; other available video games that are related to the title and/or genre of those video games previously accessed by the first player; other available video games that are associated with at least one marketing promotion; usage, conversion rate, and optimal time period of guest passes provided to the first player; and feedback of first player regarding previously provided guest passes. Also, in at least one or more embodiments, each different determination can be assigned a unique weight, and subsequently aggregated with other uniquely weighted determinations for determining the video game guest passes to be provided to the first player.

At block 604, at least one guest pass is generated and provided to the first player based on at least on determination. Flowing to block 606, the first player provides a request to send at least one guest pass to a second player. Stepping to block 608, the process establishes the membership of the second player with the platform. If the second player is not yet a member of the platform, a new membership is created. Advancing to block 610, the first player provides an invitational message offering the guest pass to the second player. Moving to block 612, the second player requests the guest pass from the platform and is subsequently provided with a unique license for "guest" access to the video game under particular conditions for a predetermined time frame.

At decision block 614, a determination is made as to whether or not the time frame for the guest access has expired. Once this condition is true, the process moves to block 616 where the platform offers at least one opportunity for the second player to obtain access to the video game. The opportunities offered to the second player to obtain access to the video game can include, but are not limited to, renewable subscription, permanent access, access for a predetermined period of time.

Figure 6B:
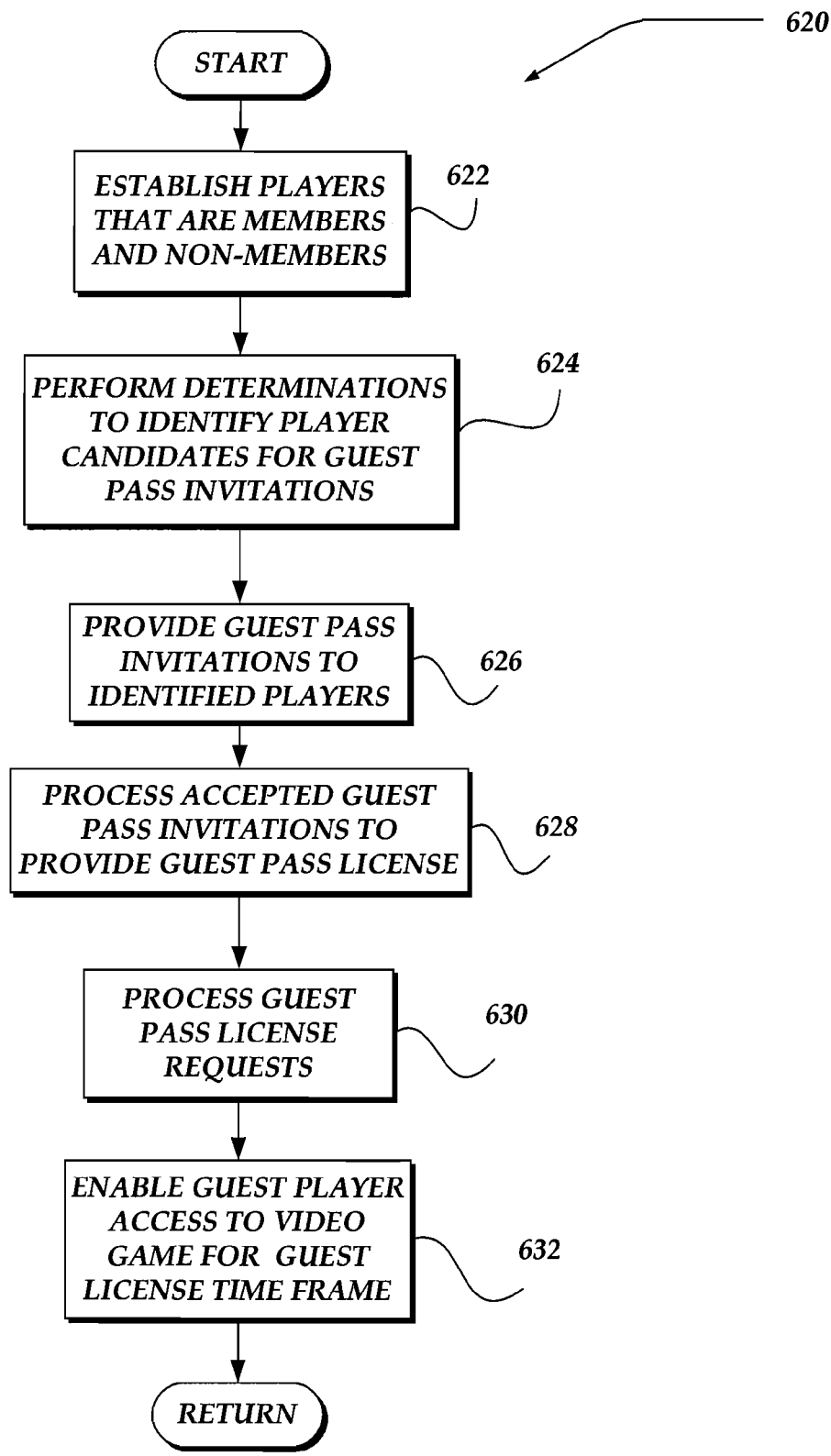
FIG. 6B illustrates a flow chart of a process for enabling a platform to provide a guest pass invitation to a player.

FIG. 6B illustrates a flow chart of process 620 for enabling a platform to automatically or manually under the direction of an administrator directly provide guest pass invitations to players. Moving from a start block the process advances to block 622 where a determination is made as to whether or not the players are members of the platform. In at least one embodiment, the non-members would be invited to join the platform to receive the guest pass invitation. In yet at least another embodiment, non-members would not be invited to join the platform at that time.

At block 624, determinations are performed to identify players that are candidates to receive the guest pass invitations. These determinations can include: player type; membership type; non-membership; title, genre, and frequency of play for video games accessed by a player; title, genre, and frequency of play for video games accessed by contacts of the player; other available video games that are related to the title and/or genre of those video games previously accessed by the player; other available video games that are associated with at least one marketing promotion; usage, conversion rate, and optimal time period of guest passes previously provided to the player; feedback of the player regarding previously provided guest passes, and the like. Furthermore, in at least one or more embodiments, each result of each different determination can be assigned a particular unique weight, and subsequently aggregated with other determinations for determining the platform originated invitations to video game guest passes to be provided to the player. Moreover, the determinations themselves may be uniquely weighted and aggregated, in addition to the weights assigned to their particular results.

At block 626, the process provides the guest pass invitations to at least a portion of the identified players. Stepping to block 628, the process receives requests for guest passes from players and in response provides the requesting players with unique guest licenses to access the video game. Flowing to block 630, the process receives guest license based requests from players to access the video game. At block 632, the process enables "guest pass" player access to the video game for a time frame determined at least in part by the guest license and/or guest pass. Next, the process returns to processing other actions.

Figure 7:
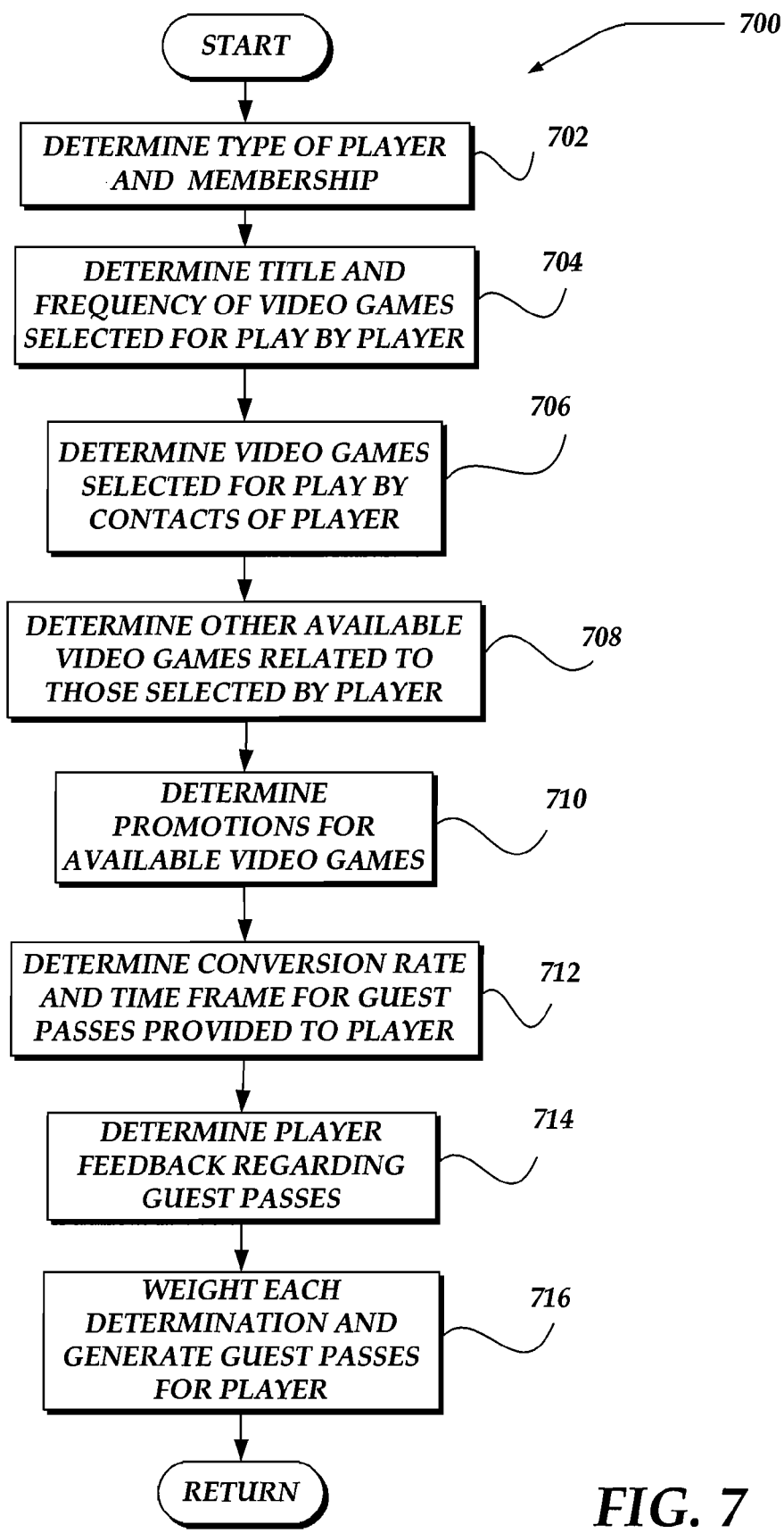
FIG. 7 shows a flow chart for a process of determinations to generate a guest pass for a video game.

FIG. 7 shows a flow chart for a process 700 of determinations to generate a guest pass for a video game for a player. Moving from a start block, the process steps to block 702 where both the type of player and the type of the player's membership are determined. The types of player memberships that might be determined could include at least one of the following: new, renewal, long term, basic, enhanced, and permanent. The membership type could also include localization information, such as language, country, and currency. Also, the types of players could include at least one of: prolific, occasional, rookie, expert, intermediate, veteran, trainer, player killer. The type of player determination could also make note of the frame of a player whose contact information is associated with a relatively large number of other players and/or whose frame is known to the administrator of the platform.

At block 704, the process determines at least one of the title, genre, difficulty, and frequency of playing for video games selected for play by the player. The genre of the selected video games can include, first person shooter, 3-D, adventure, puzzle, turn based, fantasy, casual, Christian, driving, fighting, sci-fi, western, underwater, anime, cartoon, vintage, virtual world, children, horror, massively multi-player role playing games, and/or the like. Stepping to block 706, the process determines other players that are listed in the player's contact lists, friend's lists, buddy lists, social networks, and the like. The information regarding the other players may be provided by the platform, the player, or a third party service. Also, the process further determines those video games that are selected for play by these other players but not yet selected by the player.

Next, the process flows to block 708, where a determination is made as to other available video games offered by the platform which are not yet selected for play by the player. Moving to block 710, the process further determines those available video games that are currently selected for special promotion to players. The special promotion can be initiated by the platform administrator, members of the platform, video game developers, video game publishers, and/or other third party services.

At block 712, the usage and conversion rate for previously provided guest passes to the player are determined for the player. In this way, a player that consistently uses the guest passes would be identified, and especially those players whose guest passes are often converted to subsequent purchases of further access to the video game by other players. Also, the process can determine particular time frames when usage and/or the conversion rates for guest passes are substantially better than other time frames. For example, the time frames around federal holidays or school breaks might be determined to correspond to relatively high usage and/or conversion rates for guest passes.

Advancing to block 714, a determination is made regarding positive or negative feedback by the player for previously provided guest passes. For example, if the player indicated that he did not want to receive so many guest passes, a determination might be made to provide fewer guest passes for a period of time. Similarly, if the player indicated that more guest passes would be better, a determination could be made to provide substantially more guest passes for a period of time. Also, positive or negative feed back by the player regarding a particular video game previously selected for play would be considered in a determination, as to whether or not, and how many guest passes to provide the player for that particular game. The feedback could be provided by the player to the platform in one or more different forms, including, but not limited to email, text message, chat room, blog, questionnaire, survey, and the like.

At block 716 each of the results of each determination is weighted and then summed to generate at least one guest pass. Also, in at least one embodiment, the determination itself is weighted separate from the weighting of the determination's result. The weights can be static or dynamically adjusted. Further, the weights can be managed by the platform's administrator, and in at least one embodiment, the player can adjust of at least one of the weights associated with a determination or the result of the determination.

Additionally, as listed below, exemplary equation 1 illustrates at least one embodiment for providing at least one separate weight for each result of each determination and then separately weighting these weighted determinations and aggregating each such determination to generate at least one video game guest pass candidate. Also, as shown, the aggregated weighted determinations can be further weighted.

[(player type*weight1$A$)/weight1$B$+(player membership*weight2$A$)/weight2$B$+(title*weight3$A$)/weight3$B$+(genre*weight4$A$)/weight4$B$+(difficulty*weight5$A$)/weight5$B$+(selected by player*weight6$A$)/weight6$B$+(selected by other player*weight7$A$)/weight7$B$+(promotion*weight8$A$)/weight8$B$+(conversion rate*weight9$A$)/weight9$B$+(usage rate*weight10$A$)/weight10$B$+(time frame*weight11$A$)/weight11$B$+(game feedback*weight12$A$)/weight12$B$+(guest pass feedback*weight13$A$)/weight13$B$]*weight-aggregate=video game guest pass.    Equation 1

Exemplary equation 1 is not intended to be exhaustive approach for weighting the determinations. Rather, this equation merely represents a particular embodiment of the invention. It is acknowledged that different equations that either similarly and/or not so similarly weight one or more of the determination results and/or at least one of the determinations can also be employed for substantially the same purpose as equation 1 without departing from the spirit and scope of the invention. Additionally, in at least one of the embodiments, each of the weights for determination results, the determinations themselves, and the aggregated determinations, can be substantially different, or somewhat similar to each other.

Figure 8:
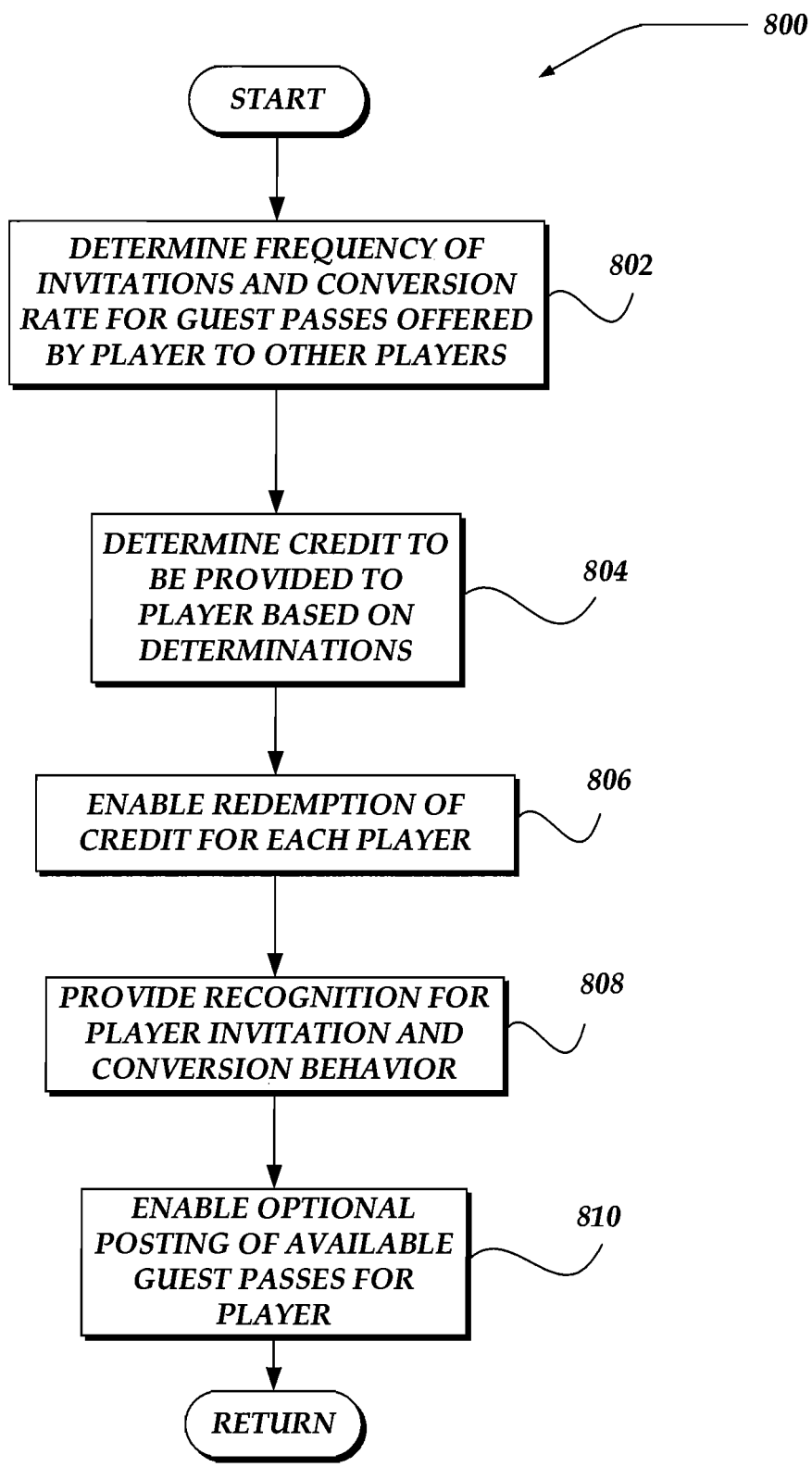
FIG. 8 shows a flow chart for a process to provide credit and recognition to a player that actively provides guest pass invitations to other players, in accordance with the invention.

FIG. 8 illustrates a flow chart for process 800 for providing recognition for at least one of offering guest pass invitations to other players or successful conversion of offered guest passes by other players. Moving from a start block, the process steps to block 802 where the frequency and conversion rate of guest passes offered to other players is determined for at least a portion of the players. Flowing from block 804, the process advances to block 804 where at least some credit is determined for at least some portion of the players based on the determined invitation frequency and conversion success rate. This credit could be embodied in one or more ways, including, but not limited to, additional access to aspects of one or more video games, additional time and/or opportunities to play one or more video games; at least partial price discounts for buying access to play one or more video games; recognition of the first player by the platform for causing at least one guest pass to be provided to one or more other players.

At block 806, the process enables the player to redeem the credit received for invitations and conversions. Advancing to block 808, the process provides recognition for player's that send out invitations and successful conversion rate behaviors. Recognition of frequent and successful invitational/conversion behavior for a player can be recognized in many ways, including, but not limited to a direct communication to the player's contacts, lists, and/or social networks, and/or one or more at least somewhat public postings at one or more locations, e.g., blogs, web sites, lists, message boards, chat rooms, and the like, that other players are likely to acknowledge.

Flowing to block 810, the process can optionally provide postings and/or direct communication of available guest passes to other players that a particular player can offer. A player can opt in or opt out of the guest pass posting to some or all of the other players. Also, the player can identify a subset of players for providing at least one of a direct communication or access to a posting of the available guest passes. Next, the process returns to other actions.

In yet at least one or more further embodiments, a full or partial list of the guest passes generated for the first player to offer to other players could be accessed or directly provided by the platform to other players that are in the first player's contacts, lists, and/or social networks. Also, in at least one embodiment, the platform could provide and/or one or more postings regarding the available guest passes associated with the first player at one or more locations, e.g., blogs, web sites, lists, message boards, chat rooms, and the like, that other players are likely to acknowledge. In at least one embodiment, the first player could be provided with the option to opt in or opt out of disclosing their available guest passes to at least a portion of the other players.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed as new and desired to be protected by Letters Patent of the United States:

1. A method implemented on a processor for providing a guest pass for a video game, wherein the method is implemented by a hardware computing device that performs actions, comprising:

performing a plurality of separately weightable determinations to generate at least one guest pass to the video game to be generated for and provided to a first player that is a member of a platform, wherein at least a portion of the determinations include a determination of a frequency of play of video games selected for play by the first player combined with a determination of video games selected for play by contacts of the first player;

providing the first player with at least one opportunity to offer the guest pass to a second player;

enabling the first player to both use the guest pass to obtain temporary access to the video game and choose to send the guest pass to the second player that is a member of the platform; and enabling both the first player and the second player to employ the guest pass to obtain a separately provided license that enables both players to install the video game and temporarily access and play the video game together.

2. The method of claim 1, wherein the opportunity to offer the guest pass further comprises:

enabling the first player to make a request of the platform to send an invitation message for the guest pass on behalf of the first player to the second player, wherein the invitation message is at least in part automatically generated by the platform; and enabling the first player to provide at least some portion of the content of the invitation message to the guest pass.

3. The method of claim 1, further comprising at least one of:

separately weighting at least one result for at least one of the plurality of determinations; or separately providing at least one weight for at least one of the plurality of determinations.

4. The method of claim 1, wherein the guest pass indicates at least one condition for providing the second player with access to the video game, including: a period of time when the guest pass is available for offering to the second player, a type of player that is compatible with the guest pass, a percentage of access to be provided to the video game, a number of times that the guest pass makes the video game accessible to the second player, amount of time that the video game is available for access by the second player once the guest pass is offered to the second player.

5. The method of claim 1, wherein the guest pass is offered to the second player is employed to obtain the license for the second player to access the video game, and wherein the provided guest pass is arranged to uniquely correspond to the second player as a member of the platform.

6. The method of claim 1, wherein the plurality of determinations include determining at least one of:
 player type;
 membership type;
 title, genre, and frequency of play for video games accessed by the first player;
 title, genre, and frequency of play for video games accessed by contacts of the first player;
 other available video games that are related to the title, and genre of those video games previously accessed by the first player;
 other available video games that are associated with at least one marketing promotion;
 usage, conversion rate, and optimal time period of guest passes previously provided to the first player;
 usage, conversion rate, and optimal time period of guest passes previously provided to the contacts of the first player; or
 feedback of first player regarding previously provided guest passes.

7. The method of claim 1, further comprising enabling the platform to directly offer at least one guest pass to play the video game to at least one of the first player or the second player.

8. The method of claim 1, further comprising providing an acknowledgement to the first player for causing the offering of the guest pass to the second player, wherein the acknowledgement is at least one of a credit or a posting.

9. The method of claim 1, further comprising enabling at least one of the players to opt in to a posting of available guest passes provided to a particular player.

10. An apparatus for enabling a guest pass for a video game, comprising:
 a memory for storing data; and
 a processor for employing the stored data to perform actions, comprising:
  performing a plurality of separately weightable determinations to generate at least one guest pass to the video game to be generated for and provided to a first player that is a member of a platform, wherein at least a portion of the determinations include a determination of a frequency of play of video games selected for play by the first player combined with a determination of video games selected for play by contacts of the first player;
  providing the first player with at least one opportunity to offer the guest pass to a second player;
  enabling the first player to both use the guest pass to obtain temporary access to the video game and choose to send the guest pass to the second player that is a member of the platform; and
  enabling both the first player and the second player to employ the guest pass to obtain a separately provided license that enables both players to install the video game and temporarily access and play the video game together.

11. The apparatus of claim 10, wherein the platform enables the second player to temporarily access and play the video game on at least one computing device, including at least one of: a personal computer, a consumer video game console, a arcade video game console, a mobile telephone, a smart watch, a handheld video game console, or a personal digital assistants (PDA).

12. The apparatus of claim 10, wherein the platform enables the second player to temporarily access and play the video game in an environment, that can include at least one of a peer to peer architecture, a client-server architecture, a remote application, a web based service, or a local application.

13. The apparatus of claim 10, wherein the opportunity to offer the guest pass further comprises:
 enabling the first player to make a request of the platform to send an invitation message for the guest pass on behalf of the first player to the second player, wherein the invitation message is at least in part automatically generated by the platform; and
 enabling the first player to provide at least some portion of the content of the invitation message to the guest pass.

14. The apparatus of claim 10, wherein the actions further comprise:
 separately weighting at least one result for at least one of the plurality of determinations; or
 separately providing at least one weight for at least one of the plurality of determinations.

15. The apparatus of claim 10, wherein the guest pass indicates at least one condition for providing the second player with access to the video game, including: a period of time when the guest pass is available for offering to the second player, a type of player that is compatible with the guest pass, a percentage of access to be provided to the video game, a number of times that the guest pass makes the video game accessible to the second player, amount of time that the video game is available for access by the second player once the guest pass is offered to the second player.

16. The apparatus of claim 10, wherein the guest pass is offered to the second player is employed to obtain a particular license for the second player to access the video game, and wherein the provided guest pass is arranged to uniquely correspond to the second player as a member of the platform.

17. The apparatus of claim 10, wherein the plurality of determinations include determining at least one of:
 player type;
 membership type;
 title, genre, and frequency of play for video games accessed by the first player;
 title, genre, and frequency of play for video games accessed by contacts of the first player;
 other available video games that are related to the title, and genre of those video games previously accessed by the first player;
 other available video games that are associated with at least one marketing promotion;
 usage, conversion rate, and optimal time period of guest passes provided to the first player;
 usage, conversion rate, and optimal time period of guest passes previously provided to the contacts of the first player; or
 feedback of first player regarding previously provided guest passes.

18. The apparatus of claim 10, wherein the actions further comprise enabling the platform to directly offer at least one guest pass to play the video game to at least one of the first player or the second player.

19. The apparatus of claim 10, wherein the actions further comprise providing an acknowledgement to the first player for causing the offering of the guest pass to the second player, wherein the acknowledgement is at least one of a credit or a posting.

20. The apparatus of claim 10, wherein the actions further comprise enabling at least one of the players to opt in to a posting of available guest passes provided to a particular player.

21. A non-transitory processor readable media that includes data for performing actions that enable a guest pass for a video game, comprising:
    performing a plurality of separately weightable determinations to generate at least one guest pass to the video game to be generated for and provided to a first player that is a member of a platform, wherein at least a portion of the determinations include a determination of a frequency of play of video games selected for play by the first player combined with a determination of video games selected for play by contacts of the first player;
    providing the first player with at least one opportunity to offer the guest pass to a second player;
    enabling the first player to both use the guest pass to obtain temporary access to the video game and choose to send the guest pass to the second player that is a member of the platform; and
    enabling both the first player and the second player to employ the guest pass to obtain a separately provided license that enables both players to install the video game and temporarily access and play the video game together.

22. The non-transitory processor readable media of claim 21, wherein the opportunity to offer the guest pass further comprises other actions, including:
    enabling the first player to make a request of the platform to send an invitation message for the guest pass on behalf of the first player to the second player, wherein the invitation message is at least in part automatically generated by the platform; and
    enabling the first player to provide at least some portion of the content of the invitation message to the guest pass.

23. The non-transitory processor readable media of claim 21, wherein the actions further comprise:
    separately weighting at least one result for at least one of the plurality of determinations; or
    separately providing at least one weight for at least one of the plurality of determinations.

24. The non-transitory processor readable media of claim 21, wherein the guest pass indicates at least one condition for providing the second player with access to the video game, including: a period of time when the guest pass is available for offering to the second player, a type of player that is compatible with the guest pass, a percentage of access to be provided to the video game, a number of times that the guest pass makes the video game accessible to the second player, amount of time that the video game is available for access by the second player once the guest pass is offered to the second player.

25. The non-transitory processor readable media of claim 21, wherein the guest pass is offered to the second player is employed to obtain a particular license for the second player to access the video game, and wherein the provided guest pass is arranged to uniquely correspond to the second player as a member of the platform.

26. The non-transitory processor readable media of claim 21, wherein the plurality of determinations include determining at least one of:
    player type;
    membership type;
    title, genre, and frequency of play for video games accessed by the first player;
    title, genre, and frequency of play for video games accessed by contacts of the first player;
    other available video games that are related to the title, and genre of those video games previously accessed by the first player;
    other available video games that are associated with at least one marketing promotion;
    usage, conversion rate, and optimal time period of guest passes provided to the first player;
    usage, conversion rate, and optimal time period of guest passes previously provided to the contacts of the first player; or
    feedback of first player regarding previously provided guest passes.

27. The non-transitory processor readable media of claim 21, wherein the actions further comprise enabling the platform to directly offer at least one guest pass to play the video game to at least one of the first player or the second player.

28. The non-transitory processor readable media of claim 21, wherein the actions further comprise providing an acknowledgement to the first player for causing the offering of the guest pass to the second player, wherein the acknowledgement is at least one of a credit or a posting.

29. The non-transitory processor readable media of claim 21, wherein the actions further comprise enabling at least one of the players to opt in to a posting of available guest passes provided to a particular player.

30. A system for enabling a guest pass for a video game, comprising:
    a server for performing actions, including:
        performing a plurality of separately weightable determinations to generate at least one guest pass to the video game to be generated for and provided to a first player that is a member of a platform, wherein at least a portion of the determinations include a determination of a frequency of play of video games selected for play by the first player combined with a determination of video games selected for play by contacts of the first player;
        providing the first player with at least one opportunity to offer the guest pass to a second player; and
        enabling both the first player and the second player as a member of the platform to employ the guest pass to obtain a separately provided license that enables both players to install the video game and temporarily access and play the video game together; and
    a client that enables the first player to both use the guest pass to obtain temporary access to the video game and choose to send the guest pass to the second player that is the platform member.

31. The system of claim 30, wherein the platform enables the second player to temporarily access and play the video game on at least one computing device, including at least one of: a personal computer, a consumer video game console, a arcade video game console, a mobile telephone, a smart watch, a handheld video game console, or a personal digital assistants (PDA).

32. The system of claim 30, wherein the opportunity to offer the guest pass further comprises:
- enabling the first player to make a request of the platform to send an invitation message for the guest pass on behalf of the first player to the second player, wherein the invitation message is at least in part automatically generated by the platform; and
- enabling the first player to provide at least some portion of the content of the invitation message to the guest pass.

33. The system of claim 30, wherein the actions further comprise separately weighting at least one result for at least one of the plurality of determinations, and separately providing at least one weight for at least one of the plurality of determinations.

34. The system of claim 30, wherein the guest pass indicates at least one condition for providing the second player with access to the video game, including: a period of time when the guest pass is available for offering to the second player, a type of player that is compatible with the guest pass, a percentage of access to be provided to the video game, a number of times that the guest pass makes the video game accessible to the second player, amount of time that the video game is available for access by the second player once the guest pass is offered to the second player.

35. The system of claim 30, wherein the guest pass is offered to the second player is employed to obtain a particular license for the second player to access the video game, and wherein the provided guest pass is arranged to uniquely correspond to the second player as a member of the platform.

36. The system of claim 30, wherein the plurality of determinations include determining at least one of:
- player type;
- membership type;
- title, genre, and frequency of play for video games accessed by the first player;
- title, genre, and frequency of play for video games accessed by contacts of the first player;
- other available video games that are related to the title, and genre of those video games previously accessed by the first player;
- other available video games that are associated with at least one marketing promotion;
- usage, conversion rate, and optimal time period of guest passes provided to the first player;
- usage, conversion rate, and optimal time period of guest passes previously provided to the contacts of the first player; or
- feedback of first player regarding previously provided guest passes.

37. The system of claim 30, wherein the actions further comprise enabling the platform to directly offer at least one guest pass to play the video game to at least one of the first player or the second player.

38. The system of claim 30, wherein the actions further comprise providing an acknowledgement to the first player for causing the offering of the guest pass to the second player, wherein the acknowledgement is at least one of a credit or a posting.

39. The system of claim 30, wherein the actions further comprise enabling at least one of the players to opt in to a posting of available guest passes provided to a particular player.

* * * * *